United States Patent
Wautelet et al.

[11] Patent Number: 5,085,295
[45] Date of Patent: Feb. 4, 1992

[54] BRAKE ROTOR AND STATOR DISCS WITH MULTIPLE RINGS JOINED BY PINS

[75] Inventors: Yves P. Wautelet, Croissy sur Seine; Charles Manin, Caluire, both of France

[73] Assignee: Carbone Industries, Bagnolet Cedex, France

[21] Appl. No.: 693,034

[22] Filed: Apr. 30, 1991

Related U.S. Application Data

[63] Continuation of Ser. No. 304,024, Jan. 31, 1989, abandoned.

[30] Foreign Application Priority Data

Feb. 2, 1988 [FR] France .................. 88 01414

[51] Int. Cl.⁵ .................. F16D 65/00; F16D 65/12
[52] U.S. Cl. .................. 188/73.2; 188/218 XL; 188/71.4; 188/264 A
[58] Field of Search .... 188/218 XL, 264 A, 264 AA, 188/73.1, 73.2, 71.5, 71.6, 264 R, 18 A, 250 B, 250 F, 250 G, 262, 234, 242, 244, 243, 71.4

[56] References Cited

U.S. PATENT DOCUMENTS

| | | | |
|---|---|---|---|
| 3,289,797 | 12/1966 | Brzezinski | 188/264 R X |
| 3,494,452 | 2/1970 | Finkin | 188/71.5 X |
| 3,759,354 | 9/1973 | Dowell et al. | 188/73.2 X |
| 3,804,213 | 4/1974 | Lucien et al. | 188/73.2 |
| 4,294,334 | 10/1981 | Shinoda et al. | 188/71.5 X |
| 4,487,301 | 12/1984 | Harrison | 188/71.5 X |
| 4,609,076 | 9/1986 | Collins et al. | 188/71.5 |
| 4,747,473 | 5/1988 | Bok et al. | 188/218 XL |

FOREIGN PATENT DOCUMENTS

| | | |
|---|---|---|
| A0171164 | 7/1986 | European Pat. Off. . |
| 0396408 | 8/1922 | Fed. Rep. of Germany ...... 188/259 |
| 3337710 | 4/1985 | Fed. Rep. of Germany ...... 188/218 XL |
| A1189381 | 4/1959 | France . |
| A2392280 | 3/1978 | France . |
| A2359321 | 9/1978 | France . |
| 2557240 | 6/1985 | France . |

Primary Examiner—Robert J. Oberleitner
Assistant Examiner—Josie A. Ballato
Attorney, Agent, or Firm—Bacon & Thomas

[57] ABSTRACT

A disk brake system is disclosed for a non-demountable rotary shaft, in which the brake has dismountable disks formed of thermostructural friction material, such as carbon-carbon, the aim being to confer to the resulting braking system the high resistance capacities which will enable it to withstand very high temperatures without being damaged, hence to dissipate very high energies. The disk brake finds use on a rotary shaft non-dismountable with respect to its carrying structure and is characterized in that two disks are constituted by at least two rings of thermostructural friction material, at least one of which ring is formed by at least two sectors in the same plane and assembled to the other ring by tightly fitted traversing pins, produced in the same material as the sectors. Angular connections are provided between the disks and, either the shaft, or one part of the structure.

21 Claims, 3 Drawing Sheets

BRAKE ROTOR AND STATOR DISCS WITH MULTIPLE RINGS JOINED BY PINS

This application is a continuation of application Ser. No. 07/304,024, filed Jan. 31, 1989, now abandoned.

The present invention relates to brakes of the type using disks mounted on rotary shafts to dissipate the kinetic energy present therein when their rotation is either slowed down or stopped.

BACKGROUND OF THE INVENTION

The invention more specifically relates to multiple-disk brakes or to heat-sink type brakes, in opposition to rotary disk brakes in which the braking counterparts are constituted by sectors or pads covering only part of the surface of the rotary disk.

Multiple disk brakes generally comprise at least one rotor disk carried by a hub which is fast in rotation with the rotary shaft. Such brakes further comprise at least one static counterpart carrying at least one stator disk immobilized in an angular position in order to be placed in facing relationship to one of the faces of the rotor disk. And such brakes are also equipped with a system which controls the displacement of the stator disk, in parallel to the axis of the rotary shaft, toward the rotor disk on which it exerts a pressure with a view to braking its rotation.

Conventionally, a brake of the aforesaid type, comprises a rotor disk made entirely of metal, and equipped on either side with friction linings which are shaped as stator disk or disk-portions, produced in a material having a very good friction coefficient. Such a structure is found to be heavy and implies the use of relatively large unsuspended masses. In an attempt to overcome this drawback, it has been proposed, particularly in French Patent No. 2 557 240 (83-20 496), to produce the rotor disk by using a metallic core and applying on its two faces friction linings in a material having a good friction coefficient, such as for example, carbon-carbon, similarly to the stator disk or disks.

A brake of the above type is generally capable of much higher performances than a brake having a rotor disk in metal. Nevertheless, such a brake has been found to be limited, regarding energy dissipation, because of the structure of the rotor disk.

Indeed, because of the very nature of the metallic core, the rise in temperature during braking is limited. This limit is estimated to around 500° C. The added friction linings, on the other hand, and particularly those in carbon-carbon, show good efficiency at higher temperatures, i.e. around 1300° C.

The limit of absorption and dissipation is therefore conditional upon the performances of the metallic core, whereas the added friction linings have unquestionably higher capacities.

In those cases where the energies to be absorbed are especially high, it is necessary to adapt on the same rotary shaft, several brakes of similar type, in order to obtain that the energy to be dissipated be distributed on each one.

This necessity results in a considerably heavier, bulkier and more expensive assembly than the one only using one disk brake.

It might be assumed that the aforesaid problem could be solved by the fact of producing the rotor disks and the stator disks as described for example in patent application EP-A-0 171 164 and in a material having a good friction coefficient such as carbon-carbon. This solution might present certain advantages in applications where the rotary shafts are dismountable. But it has proved impracticable in those cases where the rotary shafts, on the contrary, form part of heavy, complex and undismountable structures which, on the other hand, are those with the highest levels of energy to be dissipated. This is for example the case of heavy vehicles, such as land or railway vehicles, transporting heavy loads and travelling at relatively high speeds.

In those cases, the use of rotors and stators shaped as annular disks and made of, for example, carbon-carbon, is unthinkable, because such disks cannot be readily mounted and dismounted everytime they need to be replaced.

It has been the object of prior art documents such as French patents FR-A-1 189 381 and 2 359 321 (77-22 829) to overcome the above-described problems by proposing a rotor and/or stator disk constituted of a plurality of sectors interconnected by way of bolts. This particular structure, however, is impossible, when using thermostructural friction materials, because of the different thermal resistance characteristics existing between the material constituting the friction parts and the material constituting the connecting parts.

SUMMARY OF THE INVENTION

It is now the object of the present invention to eliminate the aforesaid drawbacks by providing a new disk brake system for undismountable rotary shaft, in which the brake is constituted of dismountable disks in thermostructural friction material, such as carbon-carbon, the aim being to confer to the resulting braking system the high resistance capacities which will enable it to withstand very high temperatures without being damaged, hence to dissipate very high energies.

This object is reached according to the invention, with a disk brake for rotary shaft non-dismountable with respect to its carrying structure, of the type comprising disks, which brake is characterized in that the two disks are respectively constituted by at least two rings in thermostructural friction material, one of which ring at least is formed by at least two sectors placed in the same plane and assembled to the other ring by tightly fitted traversing pins, produced in the same material as the sectors, angular connection means being provided between the disks and, either the shaft, or one part of the structure.

BRIEF DESCRIPTION OF THE DRAWINGS

The invention will be more readily understood on reading the following description with reference to the accompanying drawings, in which.

DETAILED DESCRIPTION OF PREFERRED EMBODIMENTS

Figure 1:
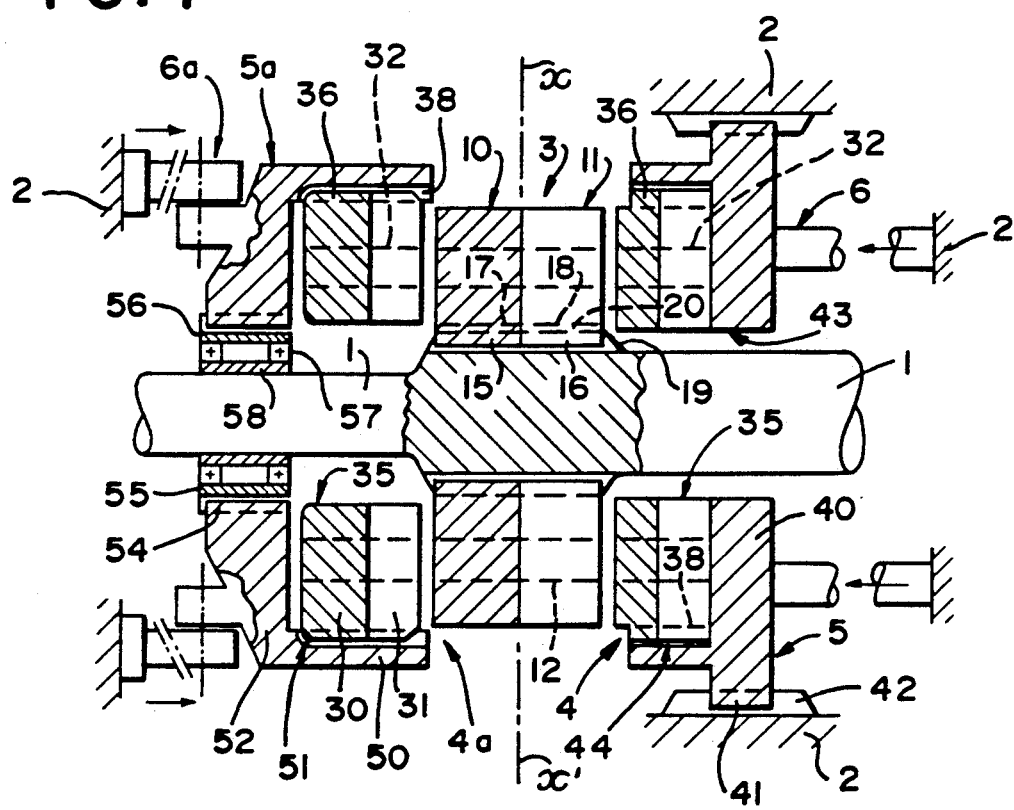
FIG. 1 is a diagrammatical view illustrating the structure of the braking system according to the invention.

Referring first to FIG. 1, this shows the braking system according to the invention as used for controlling the rotation of a rotary shaft 1 which is not readily dismountable and which is carried by a structure 2 via suspended or non-suspended bearings, not shown in the drawings.

The braking system comprises a rotor disk 3 coupled in rotation with the shaft 1, and at least one stator disk 4 or 4a carried by a static support 5 or 5a fixed to the structure 2 via a torque recovery device 6-6a controlling also the axial displacement in the direction of rotor 3. The term "disk", as used herein, should be taken in its meaning conventionally accepted in the technical field concerned, and refers to annular plate-shaped elements rather than to disks in the strictly geometrical sense.

A fact worth noting is that the braking system according to the invention can comprise a rotor disk 3 operationally coupled to a stator disk 4 or 4a, or on either side of which are placed two identical stator disks, such as 4 and 4a.

The embodiments of stators 4 and 4a illustrated in FIG. 1 are given as two examples of embodiment of the same constituting element, this explaining why they are illustrated on either side of the transverse axis of symmetry x-x' cutting through the rotor disk 3. For these two examples, a specific description is given for all constituting parts differing one from the other.

Figure 2:
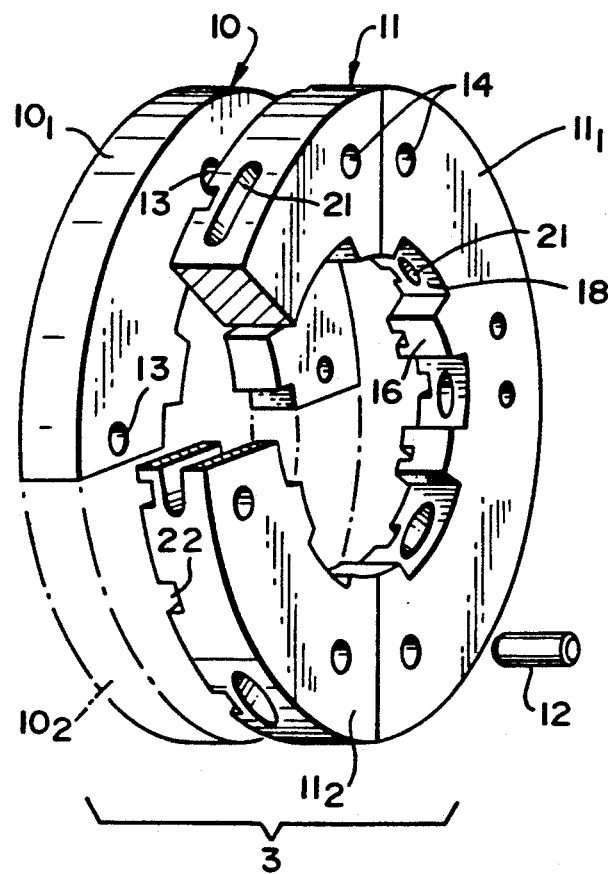
FIG. 2 is a partly exploded, partly torn perspective view, showing in more details, one element constituting the structure of the braking system.

In the example of embodiment illustrated in FIGS. 1 and 2, the rotor disk 3 is composed of two annular rings 10 and 11, each ring being constituted by at least two ring sectors $10_1$, $10_2$ and $11_1$, $11_2$. The sectors constituting each ring are placed in the same plane and the two rings are side by side. Moreover, sectors $10_1$, $10_2$ are angularly offset with respect to sectors $11_1$, $11_2$, or vice versa, of an angle corresponding to half the angle at center covered by each sector. Preferably, the sectors in each ring cover the same angular area, identical from one ring to the other.

The different sectors constituting the rings are moreover assembled together in such a way that rings 10 and 11 are joined by their opposite faces. Assembly is achieved by joining means such as pins 12 which are tightly fitted in holes 13 and 14 provided in sectors $10_1$, $10_2$ and $11_1$, $11_2$, respectively.

According to a preferred embodiment of the invention, sectors $10_1$, $10_2$ and $11_1$, $11_2$ are produced in a material having a high friction coefficient, preferably in a thermostructural material, and for example in carbon-carbon. The pins 12 are produced in a similar material in order to prevent differential expansions and to obtain that the tightly fitted pins create, by caulking, a close connection between them and the sectors. The tight fitting of the pins 12 can for example be effected with a tolerance $H_7-p_6$, but a tighter fitting is also possible.

With the above-described embodiment, it is possible to constitute a rotor disk 3 on an undismountable shaft 1, because the structural disk-likeshape is obtained by assembling sectors of rings relatively offset in two planes. In the illustrated example, each ring is formed by two sectors, but a different number of sectors could also be used.

Another possible variant could consist in adapting on the shaft a first ring, made-up in one piece, and in adding, on the face directed toward the stator disk 4, the second ring forming friction lining and being constituted by at least two sectors assembled, for example, by pins.

As indicated hereinabove, rotor disk 3 is angularly coupled to shaft 2. Possible coupling means are illustrated in FIGS. 1 and 2 showing that the sectors $10_1$, $10_2$ and $11_1$, $11_2$ are provided, on their inner peripheral edge, with teeth 15 and 16 creating between them, notches 17 and 18. Said teeth and notches are designed to cooperate with splines 19 formed by shaft 1. Although this is not shown, rings may be added on shaft 1 on either side of those rings constituting the disk 3 to ensure axial immobilization of the latter.

According to a preferred embodiment, the radial depth of notches 18 is greater than the height of the splines 19, so as to create axial passages 20 for a flow of cooling fluid. Such a flow can, for example, be induced by initiating the rotation of shaft 1. In order to improve this function, it is possible to define in disk 3, either radial channels 21 formed in the thickness of the sectors so as to issue into notches 17, 18 as well as onto the external periphery, or else radial grooves 22 formed in the opposite faces of the assembled sectors.

Figure 3:
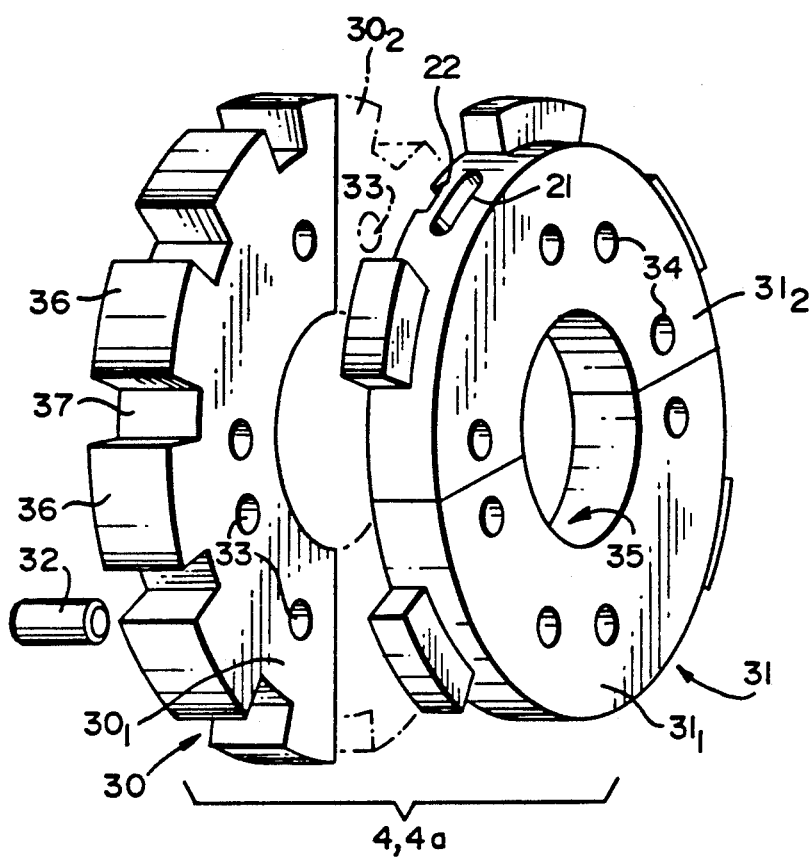
FIG. 3 is a perspective view, illustrating in a similar way to FIG. 2, another element constituting the object of the invention.

The stator disk 4 or 4a is produced in a similar way, as illustrated in FIG. 3. Accordingly, each stator disk comprises two annular rings 30 and 31, respectively constituted by two ring sectors $30_1$ and $30_2$, on the one hand, and $31_1$ and $31_2$, on the other hand. Said sectors are situated inside the same plane for each ring while being angularly offset from one ring to the other, as indicated hereinabove. The sectors are assembled by connecting means, such as in particular, pins 32 which are tightly fitted in holes 33 and 34 provided in sectors $30_1$, $30_2$ and $31_1$, $31_2$.

As already indicated hereinabove, rings 30 and 31 may also be composed of a larger number of sectors, each one covering the same angular area. It is also possible to produce each stator disk from a one-piece ring adapted on support 5 and to place, on its face oriented toward rotor disk 3, the second ring which forms the friction lining and which is constituted by sectors, preferably secured by means of the pins 32.

Ventilation and cooling means, such as channels 21 and grooves 22 may also be provided for each stator disk.

Stator disks 4 and 4a are also preferably produced in a thermostructural material, and more particularly in carbon-carbon.

Stator disks 4-4a are carried by supports 5-5a, in such a way as to be fitted with play, through their central opening 35, over the shaft 1.

The means used for fixing each stator disk on its support 5 or 5a are constituted by teeth 36, formed on the inner or outer periphery of the ring sectors in such a way as to provide notches 37 between said teeth, with a view to cooperating with splines 38 provided in the supports 5 or 5a.

According to the embodiment illustrated in FIG. 1, support 5 is constituted by an annular flange 40, forming, on its outer periphery, grooves 41 which cooperate with guide members 42 provided on the structure 2. Flange 40 is thus free to move axially while being angularly coupled to the structure 2 with respect to the shaft 1 over which it is fitted with play through its central opening 43. Said flange 40 comprises, starting from its face oriented toward rotor disk 3, a recess 44 of cylindrical shape, whose inner periphery is provided with the splines 38. The stator disk 4 is inserted into the recess 44 in such a way as to be held therein at an angle by engagement of the teeth 36 and notches 37 with the splines 38.

Flange 40 is provided, on its face opposite to recess 44, with means of connecting it with the device 6 which may be of any suitable nature while being constituted by an actuating member such as, in particular, of hydraulic type with piston.

Stator disk 4a is mounted in a similar way in a bell-shaped part 50 of the support 5a. The bell-shaped part 50 defines a recess 51 of general cylindrical shape, whose inner peripheral edge carries the splines 38. Part 50 comprises, in its disk 52, an opening 53 provided with splines 54 cooperating with complementary splines 55 provided in a ring 56 mounted, via ball bearings 57, on a ferrule 58 built onto the shaft 1. The bell-shaped part 50 is coupled to the structure 2 via the device 6a, which can be of a similar type to the device 6. The mounting of support 5a permits a relative axial displacement with respect to the ring 56 in relation to which the rotation of the shaft is kept up by means of rolling bearings 57. The depth of splines 54 is greater than the height of splines 56, so as to create a play allowing an air flow in axial direction.

The braking system described hereinabove, and comprising a rotor disk and at least one stator disk of either type 4 or 4a, provides the means of braking and of dissipating the kinetic and thermal energy by using disks made in a material having a high friction coefficient, which can be readily mounted and dismounted with respect to the undismountable shaft 1. It becomes then possible to obtain efficient brakes on rotary structures for which it is normally customary to resort to hybrid assemblies using friction linings adapted on metallic carrying structures of which the working limits, particularly temperature-wise, are below those of the friction linings.

According to the variant embodiment illustrated in FIG. 4, the rotor disk 3 comprises two rings 10 and 11 which are constituted as described hereinabove, being however mounted on either side of a central core 60 which is likewise produced in a thermostructural material. In such a case, the conduits 21 and/or the grooves 22 are advantageously provided in the central core 60 on which sectors $10_1$, $10_2$ and $11_1$, $11_2$ are mounted via traversing pins 61 force fitted therethrough as well as through holes 62 provided in the core 60.

Advantageously also, in such a case, the inner periphery of the ring 60 is provided with teeth 63 and notches 64 adapted to cooperate with the splines 19.

Figure 4:
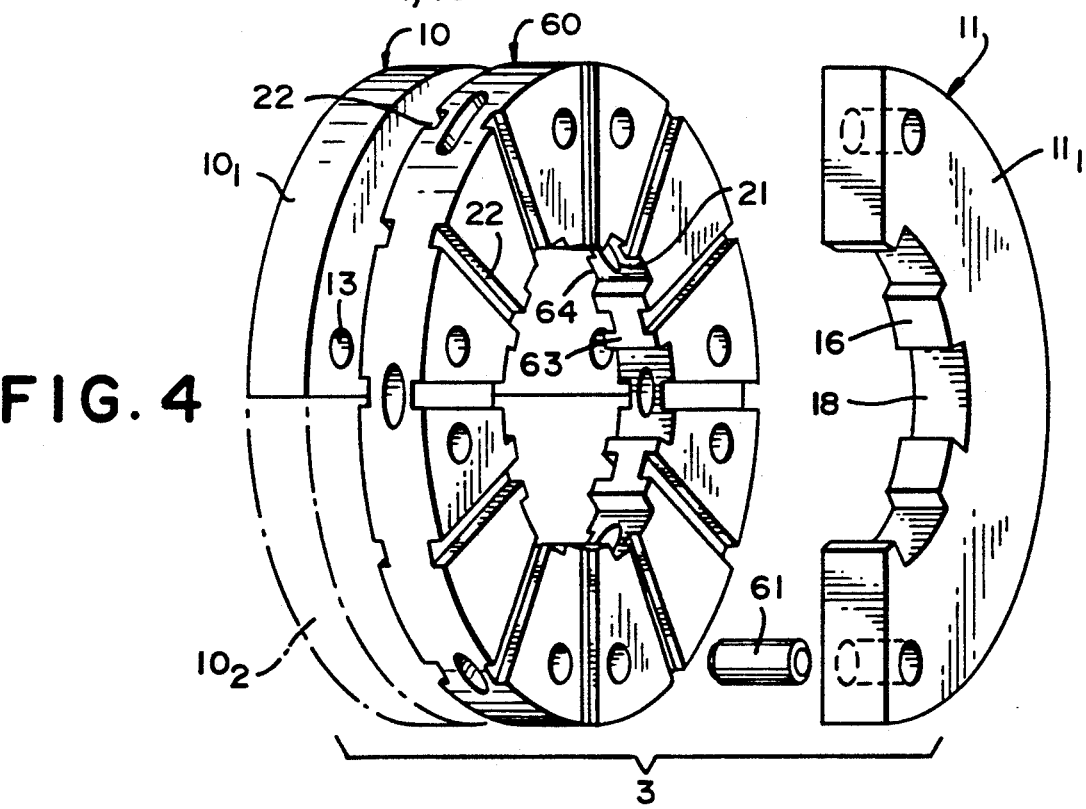
FIG. 4 is a partly exploded perspective view, illustrating a variant embodiment of the element shown in FIG. 2.
Figure 5:
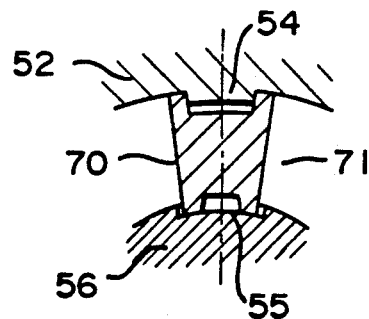
FIG. 5 is a cross-sectional view illustrating, on an enlarged scale, a development of one of the elements constituting the invention.

FIG. 5 shows that the angular connection between the ring 56 and the disk 52, whether the latter is produced according to FIG. 2 or FIG. 4, can imply the insertion of keys 70 cooperating respectively with the splines 54 and 55. Said keys 70 permit the creation, between the inner peripheral edge of the support 5 and of the ring 56, of a gap 71 inducing an axial ventilation and an air flow capable of efficiently cooling the braking system constituted under the structural shape of a heat sink system.

Figure 6:
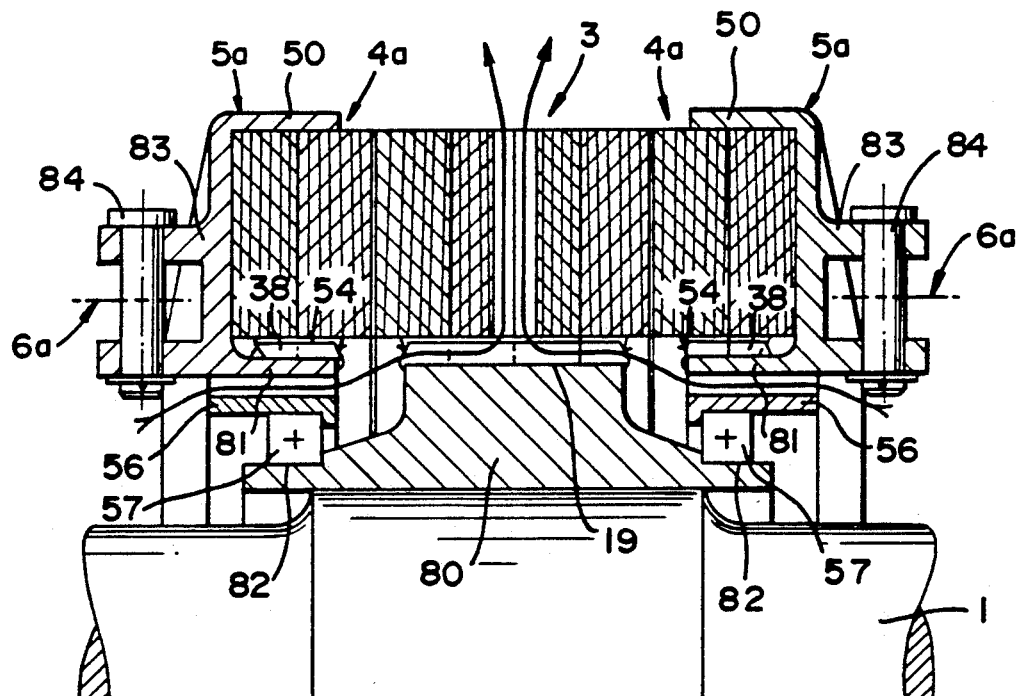
FIGS. 6 and 7 are diagrammatical elevational cross-sections showing two examples of application of the object of the invention.

FIG. 6 illustrates a more practical example of embodiment of the heat sink type braking system, comprising, on an undismountable shaft 1, a rotor disk 3 and two stator disks 4a. In this example, the rotor disk 3 is of the type shown in FIG. 4 and is mounted on the splines 19 which are formed by a ferrule 80 built onto the shaft 1. The stator disks are mounted in supports 5a in which they are immobilized at an angle by splines 54 provided in the inner periphery for cooperating with the splines 38 which are also provided from an inner flange 81 of each support 5a. Ferrule 80 defines at its two end parts, two bearing surfaces 82 for mounting the rolling bearings 57 supporting the rings 56. Each support 5a is equipped with a caliper 83 for connection via a pin 84 with the device 6a.

Figure 7:
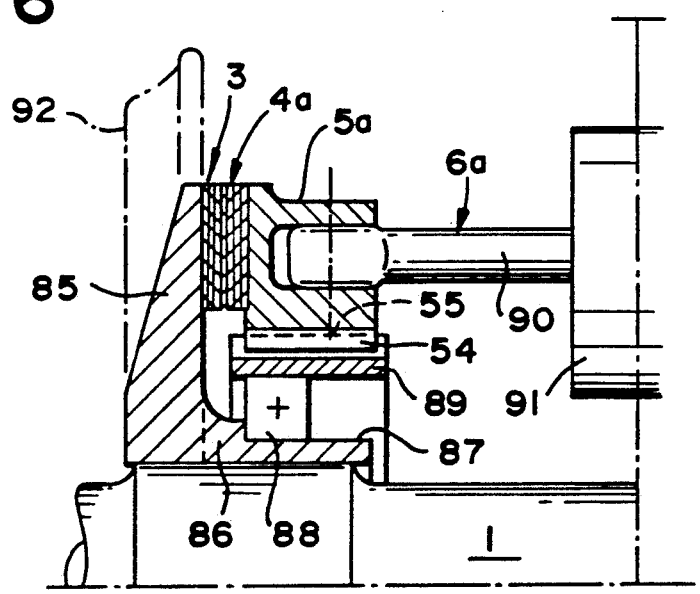

FIG. 7 shows one example of application whereby the rotor disk 3, which is produced as explained hereinabove with reference to FIGS. 2 or 4, is supported by a plate 85 formed by a ferrule 86 fixed on shaft 1. In this particular embodiment, the ferrule 86 also constitutes, by its periphery, a bearing surface 87 for centering one or more rolling bearings 88, supporting a ring 89, of the same type as ring 56, permitting the mounting of a support 5a carrying a stator disk 4a. As in the preceding embodiments, the support 5a is connected to a torque recovery and axial displacement control device 6a which is, for example, constituted by a connecting rod 90 constituting the piston rod of a hydraulic jack 91.

Plate 85 can, optionally and as diagrammatically illustrated in broken lines, constitute the disk of a wheel 92, for example in a railway vehicle. In such a case, it is possible to use a two-rod jack 91, so as to simultaneously control two braking systems working simultaneously on the two wheels 92 of the same shaft 1 constituting a supporting axle.

The invention is in no way limited to the examples of embodiments described hereinabove and on the contrary covers any modifications which can be brought thereto without departing from its scope.

What is claimed is:

1. A disk brake system for a rotary shaft nondemountably attached to a non-rotating structure so as to rotate about a rotating axis, comprising:
   a) a rotor disc assembly comprising a plurality of rotor rings, each rotor ring comprising a plurality of rotor sectors;
   b) means connecting the rotor rings together such that joints between adjacent rotor sectors of one rotor ring are angularly offset with respect to joints between adjacent sectors of an adjacent rotor ring, wherein the means connecting the rotor rings comprises a plurality of holes defined by the rotor sectors located so as to be in alignment between adjacent rotor rings and a pin inserted in each aligned hole so as to extend only between adjacent rotor rings;
   c) first connection means attaching the rotor disc assembly to the rotatable shaft so as to rotate therewith, wherein the first connection means comprises teeth provided on a peripheral edge of one of the rotor disc assembly and rotary shaft, and cooperating splines formed on the other of the rotor disc assembly and rotary shaft;
   d) two independent stator disc assemblies disposed on opposite sides of the rotor disk assembly and comprising stator rings held by static supports centered on the rotary shaft by means of bearings, the stator rings comprising a plurality of stator sectors;
   e) means connecting the stator rings together such that joints between adjacent stator sectors of one stator ring are angularly offset with respect to joints between adjacent stator sectors of an adjacent stator ring, wherein the means to connect the stator rings together comprises a plurality of holes defined by the stator sectors located so as to be in alignment between adjacent stator rings, and a pin inserted in each aligned hole so as to extend only between adjacent stator rings;

f) second connection means for non-rotatably attaching the stator disc to the nonrotating structure, wherein the second connection means comprises slidable connection means interposed between the static supports and the bearings so as to permit an axial displacement of said static supports and to define an axial ventilation gap therebetween; and, g) actuating means operatively interposed between the non-rotating structure and the static supports to axially move the static supports and the stator rings into and out of contact with the rotor disc assembly so as to provide a braking force to the rotatable shaft when the stator rings are pressed against the opposite sides of the rotor disc assembly.

2. Disc brake system as claimed in claim 1, wherein at least the rotor disk comprises a core coupled to the rotary shaft so as to rotate therewith and provided, on each one of its faces, with a ring of friction material.

3. Disc brake system as claimed in claim 2, wherein the radial ventilation channels are defined by the core.

4. Disc brake system as claimed in claim 2 wherein the friction material is carbon.

5. Disc brake system as claimed in claim 1 wherein at least the rotor disk assembly defines generally radially extending ventilation channels.

6. Disc brake system as claimed in claim 5, wherein the generally radially extending ventilation channels are defined by adjacent faces of the ring sectors.

7. The disk brake system as claimed in claim 5 wherein at least one generally radially extending ventilation channel is completely defined by each rotor sector of at least one rotor ring.

8. Disc brake system as claimed in claim 1 wherein the second connection means further comprises means to attach the static support to a device controlling the torque recovery and rectilinear displacement in the direction of the rotor disk.

9. Disc brake system as claimed in claim 8, wherein said slidable connection means comprises a splined ring carried by a ferrule attached to the shaft.

10. Disc brake system as claimed in claim 9, wherein said static support is mounted for sliding on said splined ring via insertion keys defining axial passages.

11. Disc brake system as claimed in claim 1, wherein the rotor disc assembly is attached to a plate rotatable with the shaft.

12. Disc brake system as claimed in claim 11, wherein said plate is formed by a disk portion, of a wheel driven in rotation by the shaft.

13. Disc brake system as claimed in claim 11, wherein said plate is formed by a ferrule attached to the shaft.

14. Disc brake system as claimed in claim 1 wherein each rotor ring is made of a friction material.

15. Disc brake system as claimed in claim 14 wherein the friction material is carbon.

16. Disc brake system as claimed in claim 1 wherein each stator ring is made of friction material.

17. Disc brake system as claimed in claim 16 wherein the friction material is carbon.

18. The disk brake system as claimed in claim 1 wherein the rotor rings pin inserted into each aligned hole is formed of the same material as the rotor rings.

19. The disk brake system as claimed in claim 18 wherein each pin is press fit into the aligned holes and extend substantially transverse to a plane of the rotor rings.

20. The disk brake system as claimed in claim 1 further comprising a heat sink ferrule member attached to the rotary shaft so as to rotate therewith, the heat sink ferrule member defining splines which cooperate with splines formed on the rotor disc assembly such that the rotor disc is attached to the ferrule member so as to rotate therewith.

21. The disk brake system as claimed in claim 20 wherein the bearings are operatively interposed between the heat sink ferrule member and the non-rotating structure so as to rotatably support the shaft therein.

* * * * *